US012658607B2

(12) United States Patent
Neumann-Henneberg

(10) Patent No.: US 12,658,607 B2
(45) Date of Patent: Jun. 16, 2026

(54) CRIMP CONNECTOR FOR MECHANICALLY AND ELECTRICALLY CONDUCTIVELY CONNECTING AN ELECTRICAL CONNECTING CONTACT TO AN ELECTRICAL CONDUCTOR, AND CRIMP CONNECTION OF AN ELECTRICAL CONNECTING CONTACT TO AN ELECTRICAL CONDUCTOR

(71) Applicant: AKNH Kontaktsysteme GmbH, Kirchheim unter Teck (DE)

(72) Inventor: Wolf Neumann-Henneberg, Sinsheim (DE)

(73) Assignee: AKNH Kontaktsysteme GmbH, Kirchheim (DE)

( * ) Notice: Subject to any disclaimer, the term of this patent is extended or adjusted under 35 U.S.C. 154(b) by 316 days.

(21) Appl. No.: 18/376,876

(22) Filed: Oct. 5, 2023

(65) Prior Publication Data

US 2024/0128659 A1 Apr. 18, 2024

(30) Foreign Application Priority Data

Oct. 13, 2022 (EP) .................................... 22201381

(51) Int. Cl.
*H01R 4/18* (2006.01)

(52) U.S. Cl.
CPC .................................... *H01R 4/184* (2013.01)

(58) Field of Classification Search
CPC ........ H01R 43/048; H01R 4/185; H01R 4/18; H01R 43/28; H01R 4/20; H01R 43/16; H01R 43/058
See application file for complete search history.

(56) References Cited

U.S. PATENT DOCUMENTS

| | | | | | |
|---|---|---|---|---|---|
| 4,142,771 | A * | 3/1979 | Barnes | H01R 4/184 | 439/442 |
| 7,104,812 | B1 * | 9/2006 | Bogiel | H01R 12/724 | 439/79 |
| 7,347,741 | B1 * | 3/2008 | Yeomans | H01R 24/20 | 439/744 |
| 9,343,819 | B2 * | 5/2016 | McGann | H01R 4/10 | |
| 11,637,405 | B2 * | 4/2023 | Droesbeke | H01R 43/04 | 439/607.41 |
| 2005/0233638 | A1 * | 10/2005 | Taylor | H01R 4/183 | 439/585 |
| 2006/0160419 | A1 | 7/2006 | Wang | | |

(Continued)

FOREIGN PATENT DOCUMENTS

| | | | |
|---|---|---|---|
| EP | 2 495 813 | A1 | 9/2012 |
| EP | 2 846 404 | A1 | 3/2015 |
| JP | 2020-071908 | A | 5/2020 |

OTHER PUBLICATIONS

Extended European Search Report for corresponding Application No. 22201381.5, dated Mar. 30, 2023.

*Primary Examiner* — Truc T Nguyen
(74) *Attorney, Agent, or Firm* — Renner, Otto, Boisselle & Sklar, LLP

(57) ABSTRACT

A crimp connector for connecting an electrical conductor is designed with layered metal sheets that have cutouts with differing widths in a connection zone, which form a trough-shaped depression having a step-shaped cross-section as a holder for the electrical conductor.

11 Claims, 4 Drawing Sheets

(56) References Cited

U.S. PATENT DOCUMENTS

| | | | | |
|---|---|---|---|---|
| 2006/0246777 | A1* | 11/2006 | Wang | H01R 9/0518 439/582 |
| 2010/0297894 | A1* | 11/2010 | Ootsuka | H01R 4/185 439/877 |
| 2012/0071029 | A1* | 3/2012 | Millevik | H02G 3/22 439/607.25 |
| 2018/0248280 | A1 | 8/2018 | Takahashi et al. | |
| 2019/0020163 | A1* | 1/2019 | Saito | H01R 43/058 |
| 2019/0181599 | A1* | 6/2019 | Guillanton | H01M 50/503 |
| 2023/0163534 | A1* | 5/2023 | Mitsui | H01R 13/6581 439/607.5 |
| 2023/0246371 | A1* | 8/2023 | Bossuyt | H01R 24/66 439/816 |

* cited by examiner

CRIMP CONNECTOR FOR MECHANICALLY AND ELECTRICALLY CONDUCTIVELY CONNECTING AN ELECTRICAL CONNECTING CONTACT TO AN ELECTRICAL CONDUCTOR, AND CRIMP CONNECTION OF AN ELECTRICAL CONNECTING CONTACT TO AN ELECTRICAL CONDUCTOR

CROSS-REFERENCE TO RELATED APPLICATION

This application claims priority under 35 USC § 119 to European Application No. 22 201 381.5, filed on Oct. 13, 2022, the entire disclosure of which is incorporated herein by reference.

TECHNICAL FIELD OF THE INVENTION

The invention relates to a crimp connector for mechanically and electrically conductively connecting an electrical connecting contact to an electrical conductor, and to a crimp connection comprising the crimp connector.

The electrical connecting contact is provided to electrically conductively connect the electrical conductor to a power source, for example, or to electrically conductively connect the electrical conductor to another electrical conductor. The connecting contact can comprise a plug contact or an eyelet, for example.

The electrical conductor is a cable, for example, and in particular a stranded wire.

DISCUSSION OF THE RELATED ART

Crimp connectors for mechanically and electrically conductively connecting an electrical connecting contact to an electrical conductor, such as a cable or a stranded wire, are known, for example, from so-called cable lugs. Cable lugs are stamped from a flat metal sheet and bent to yield the cable lug. In the extension of the actual cable lug, cable lugs comprise an appendage, which can also be interpreted as a shaft of the cable lug and from which, after stamping, tabs protrude on both sides, which are bent to form a crimp clamp around the electrical conductor and are crimped in place, whereby the tabs enclose the electrical conductor in the form of a crimp clamp and clamp the conductor in place between themselves and at the appendage of the cable lug.

SUMMARY OF THE INVENTION

It is the object of the invention to provide a crimp connector and a crimp connection, having low electrical transition resistance to an electrical conductor, which are suitable for high electrical current intensities of several 100 A, for example 800 A and more.

According to the invention, this object is achieved by a crimp connector as described herein.

The crimp connector according to the invention is provided for the mechanical and electrically conductive connection to an electrical conductor, in particular to a stranded wire, which is to say an electrical conductor made of individual wires. The crimp connector comprises a crimping zone, for the connection to the electrical conductor, and a crimp clamp that, when the connection has been established, encloses the electrical conductor, crimping the same between itself and at the connection zone of the crimp connector. This means that the crimp clamp clamps the electrical conductor in place within itself by way of crimping, which is to say by a plastic deformation of the crimp clamp, and thereby mechanically and electrically conductively fixes the electrical conductor at the connection zone of the crimp connector. The crimp clamp can, for example, be annular or comprise one or two tabs, tongues or the like, which are bent by way of plastic deformation to form the crimp clamp.

According to the invention, the crimp connector has a trough-shaped depression in the connection zone, in which the electrical conductor is disposed for connection and clamped in place by way of the crimp clamp.

The trough-shaped depression enhances mechanical retention of the electrical conductor at the crimp connector and, in particular, decreases electrical transition resistance between the crimp connector and the electrical conductor as a result of the electrical conductor conforming to the depression in the connection zone of the crimp connector when the electrical conductor is crimped in place by way of the crimp clamp, whereby the electrically conductive connection between the crimp connector and the electrical conductor is enhanced.

The trough-shaped depression can, for example, have an angular, for example rectangular or trapezoidal, or a rounded, for example circular or elliptical, cross-section. A preferred embodiment of the invention provides a step-shaped depression including steps that extend in a longitudinal direction of the depression. A step-shaped cross-section of the depression has proven to be advantageous in terms of a low electrical transition resistance between the crimp connector and the electrical conductor.

The trough-shaped depression can have been produced by way of plastic deformation, for example embossing, or by way of machining, for example grinding or milling. One embodiment of the invention provides for the crimp connector, in any case, to comprise stacked or layered metal sheets, which is to say metal sheets disposed on top of one another, in the connection zone. One of the layered metal sheets, which is also referred to as a base metal sheet, bridges the depression at a base. The base metal sheet essentially forms a base of the depression. Metal sheets disposed in a layered manner on one side of the base metal sheet have cutouts, which laterally delimit the depression. So as to form the step shape of the depression, the cutouts of metal sheets disposed closer to the base metal sheet are narrower than those of metal sheets disposed further away from the base metal sheet, so that the depression becomes increasingly wider in a step-shaped manner as the distance with respect to the base metal sheet increases. Generally, one metal sheet having a cutout on one side of the base metal sheet suffices, whereby a one-step depression is formed. Preferably, several layered metal sheets having cutouts with differing widths are disposed on the one side of the base metal sheet, wherein several metal sheets can have cutouts of identical width for forming a step. It is also possible for several metal sheets having no cutout to be present, serving as base metal sheets.

The crimp clamp of preferred embodiments of the invention is a component that is separate from the crimp connector and that encloses the connection zone of the crimp connector and, when the connection has been established, the electrical conductor. The crimp clamp can thus be made of a different material, for example in the form of a non-layered metal sheet, and/or has a different thickness than the layered metal sheets in the connection zone of the crimp connector. The design of the crimp clamp as a separate component allows the function thereof to be adapted without being limited by the configuration of the connection zone.

A refinement provides that the crimp clamp holds the layered metal sheets in the layered and intended position with respect to one another, in which the cutouts of the layered metal sheets form the depression in the connection zone of the crimp connector. Once the crimp connection is established, the crimp clamp clamps the layered metal sheets together and against the electrical conductor.

For example, the layered metal sheets have apertures through which the crimp clamp passes, wherein the crimp clamp holds the apertures of the metal sheets congruently on top of one another, thereby holding the layered metal sheets in the intended positions thereof. The apertures in the layered metal sheets are preferably provided on both sides of the depression so that the crimp clamp passing through the apertures holds the layered metal sheets better in a torsion-proof manner with respect to one another.

In a preferred embodiment of the invention, the crimp clamp has an in particular U-shaped bracket, which encloses the electrical conductor on one side of the connecting contact without interruption and crimps the same in place. The crimp clamp is fixed at the connecting contact on both sides of the electrical conductor and encloses the electrical conductor without interruption from one side to an opposite side of the electrical conductor. The crimp clamp clamps the electrical conductor in place between itself and the connecting contact and clamps the electrical conductor in the depression in the connecting contact. Since the crimp clamp, in this embodiment of the invention, encloses the electrical conductor without interruption, the crimp clamp cannot become loosened by bending open, whereby the clamping of the electrical conductor in the crimp clamp and at the connecting contact of the crimp connector according to the invention is improved.

According to a refinement of the invention, the crimp clamp has a protrusion, which is integrally formed in the electrical conductor, on the inner side of crimp clamp facing the electrical conductor. The protrusion of the crimp clamp forms a depression in the electrical conductor and projects from the inner side of the crimp clamp into the depression of the electrical conductor. This causes form fit between the crimp clamp and the electrical conductor, which prevents the electrical conductor from being pulled out of the crimp clamp. This retention as a result of form fit additionally causes the electrical conductor to be retained in the crimp clamp due to the clamping force thereof, whereby the mechanical retention of the electrical conductor in the crimp clamp and in the depression in the connecting contact of the crimp connector according to the invention is improved.

The crimp connection according to the invention having the features of claim 10 comprises an electrical connecting contact including a crimp connector of the above-described type and an electrical conductor, which is disposed in the depression in the connection zone of the crimp connector, enclosed by the crimp clamp and, by way of the crimp clamp, clamped in place in the crimp clamp and in the depression in the connection zone of the crimp connector, which is to say is mechanically fixed by plastic deformation of the crimp clamp and electrically conductively connected to the crimp connector and, by way of the crimp connector, is electrically conductively connected to the connecting contact.

The connecting contact, for example, comprises an electrical plug connector, for example a plug or a coupling as a mating piece for a plug, an electrical screw connector or an eyelet for establishing an electrically conductive screw connection. The list is by way of example and not exhaustive. The connecting contact of the crimp connector is provided for electrically conductively connecting the electrical conductor to, for example, a power source or another electrical conductor.

The electrical conductor comprises a cable, for example, and in particular a stranded wire.

All of the features mentioned in the description and/or shown in the drawing can be implemented individually, alone, or in any arbitrary combination, in embodiments of the invention. Embodiments of the invention that do not comprise all, but only some of the features of a claim, including of the independent claim, are possible.

BRIEF DESCRIPTION OF THE DRAWINGS

The invention will be described hereafter in greater detail based on one exemplary embodiment shown in the drawing. In the drawings.

DETAILED DESCRIPTION OF THE EMBODIMENT(S)

Figure 1:
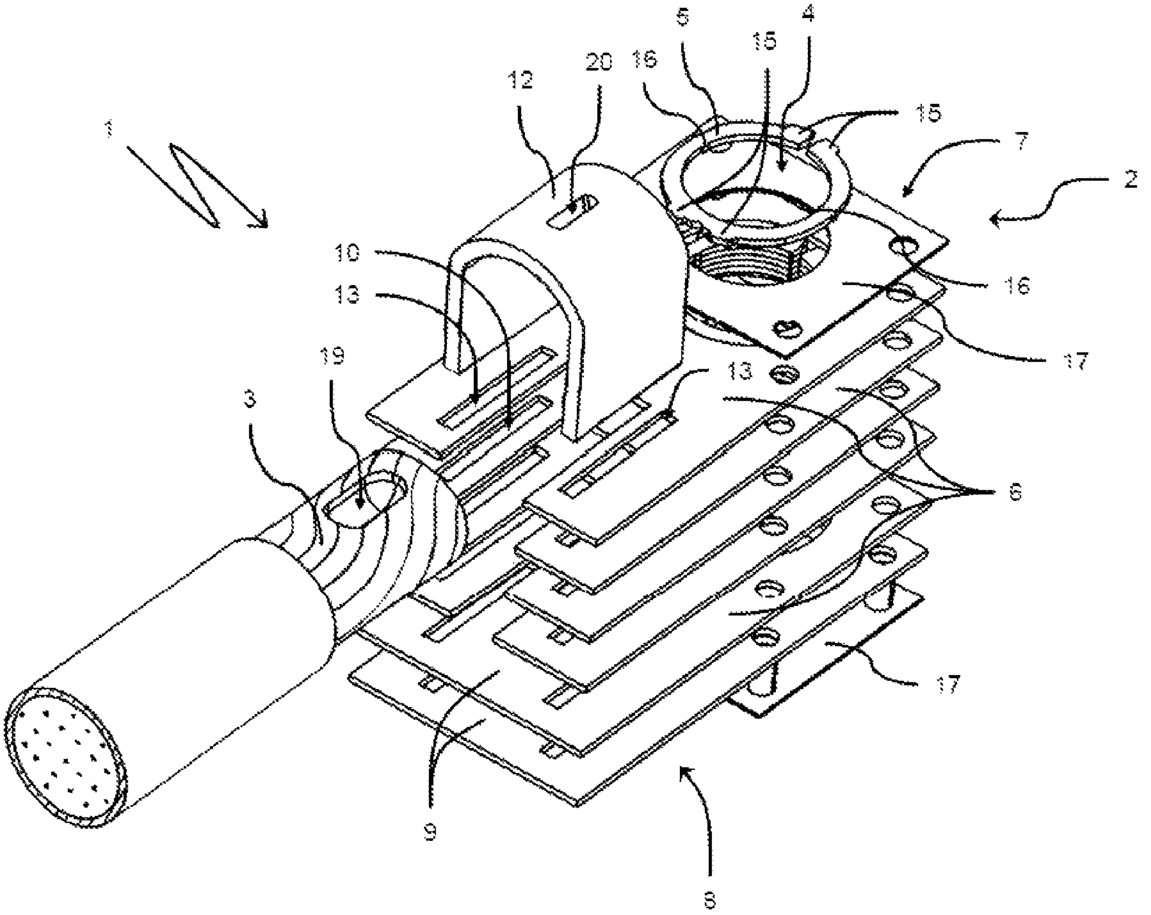
FIG. 1 shows a exploded perspective view of a crimp connector according to the invention.

The crimp connector 1 according to the invention shown in the drawings comprises an electrical connecting contact 2 and is provided for a mechanical and electrically conductive connection to an electrical conductor 3. In the exemplary embodiment, the electrical connecting contact 2 is designed as a plug coupling having an insertion hole 4 for inserting or attaching a, for example, cylindrical mating contact, which is not shown.

In the insertion hole 4, the connecting contact 2 comprises a stack of contact yoke springs 5, which are disposed so as to be coaxially stacked on top of one another. In the exemplary embodiment, the contact yoke springs 5 are circular and open at one point of the circumference. At mutually opposing points of the circumference, these have, in the exemplary embodiment, a total of four, outwardly projecting outer protrusions 15, which rest against the insertion hole 4 on the inside of the connecting contact 2. On the inside, the contact yoke springs 5 have, in the exemplary embodiment two, inner protrusions 16 at points of the circumference located opposite one another, which project inwardly and rest with radial pretension against the, for example cylindrical, mating contact (not shown) when the mating contact is inserted into the insertion hole 4 or into the contact yoke springs 5 in the insertion hole 4 of the connecting contact 2. In the exemplary embodiment, the contact yoke springs 5 are stamped sheet metal parts, with other embodiments being possible according to the invention. FIG. 1 shows a contact yoke spring 5 over a cover sheet 17 of the connecting contact 2 of the crimp connector 1 according to the invention so as to illustrate the shape of the contact yoke springs 5.

As a result of the radial pretension with which the contact yoke springs 5 rest against the mating contact, which is not shown, when the mating contact has been inserted into the insertion hole 4, or into the contact yoke springs 5 of the connecting contact 2 of the crimp connector 1 according to the invention, the crimp connector 1 has favorable electrical contact with low electrical transition resistance between the connecting contact 2 of the crimp connector 1 and the inserted mating contact, which is not shown.

So as to axially hold the contact yoke springs 5, which are stacked in the insertion hole 4 of the connecting contact 2 of the crimp connector 1 according to the invention, in the insertion hole 4, the cover sheets 17 at the top and bottom are disposed on the contact region 7 and have a hole that is concentric with respect to the insertion hole 4 and covers the contact yoke springs 5, thereby holding these axially in the insertion hole 4. The diameter of the hole in the cover sheets 17 is at least as large as an inside diameter of the contact yoke springs 5 so that the inner protrusions 16 of the contact yoke springs 5 protrude inwardly beyond the hole in the cover sheets 17. So as to make visible the contact yoke springs 5 stacked in the insertion hole 4 of the connecting contact 2, FIG. 2 does not show the upper of the two cover sheets 17.

According to the invention, the crimp connector 1 comprises metal sheets 6 that are stamped, laser-cut or produced in another manner and disposed in a layered manner so as to be congruently situated on top of one another or rest against one another. Due to the layered arrangement against or on top of one another, the metal sheets 6 can also be interpreted as being stacked or laminated.

Each of the metal sheets 6 comprises a contact region 7 including the insertion hole 4 and a connection zone 8. The contact regions 7 of the layered metal sheets 6 form the connecting contact 2 of the crimp connector 1 according to the invention.

With the exception of one or more base metal sheets 9, the metal sheets 6 have a cutout 10, which in the exemplary embodiment is rectangular, in the connection zone 8, the cutouts being situated on top of one another and forming a trough-shaped depression 11 when the metal sheets 6 are disposed congruently layered on top of or against one another. As described, one or more of the metal sheets 6, which are arbitrarily two of the metal sheets 6 in the exemplary embodiment, do not have a cutout 10, but bridge the cutouts 10 in the connection zones 8 of the other sheets 6. The metal sheets 6 without a cutout 10, which are also referred to as base metal sheet or sheets 9 here, are located on one side of the layered metal sheets 6, which is to say the metal sheets 6 having the cutouts 10 are layered on one side of the metal sheet or sheets 6 without a cutout 10, which is to say are disposed on one side of the base metal sheets 9 such that the metal sheet (or sheets) 9 delimits (or delimit) the depression 11, formed by the cutouts 10 in the other metal sheets 6, at a base of the depression 11, which is to say the base metal sheet (or sheets) 9 forms (or form) the base of the depression 11 formed by the cutouts 10 in the other metal sheets 6 in the connection zone 8 of the crimp connector 1 according to the invention.

The cutouts 10 in the metal sheets 6 have different widths, and more particularly the cutouts 10 in the metal sheets 6 that are closer to the metal sheet or sheets 9 are narrower than the cutouts 10 in metal sheets 6 that are further away from the base metal sheet or sheets 6. The cutouts 10 in the metal sheets 6 thus become wider as the distance with respect to the base metal sheet or sheets 9 increases. The depression 11 in the connection zone 8 of the crimp connector 1 according to the invention is thus step-shaped and has a step-shaped cross-section or step-shaped longitudinal sides or cheeks on both sides. So as to form the steps on both sides of the depression 11, it is also possible for two or more metal sheets 6 in each case to have equally wide cutouts 10 and thereby jointly form a step. In the exemplary embodiment, the cutouts 10 of all metal sheets 6 have differing widths.

Figure 2:
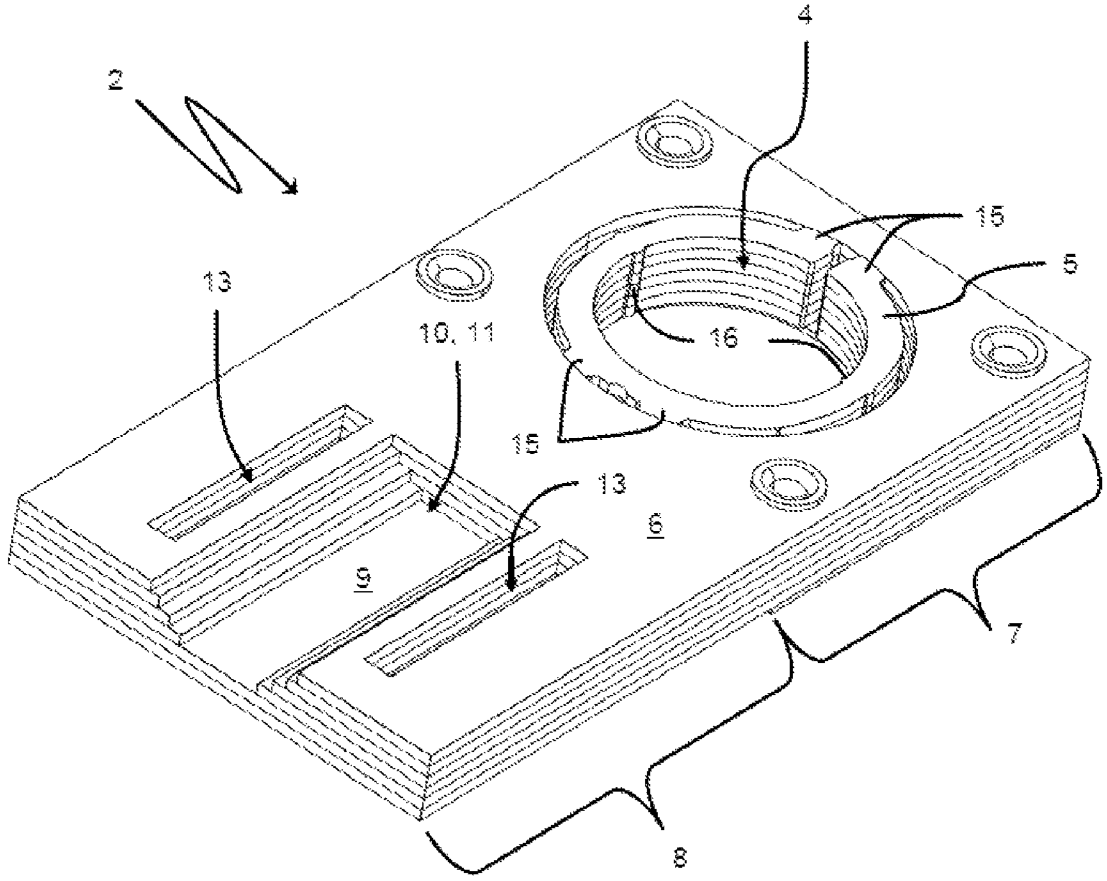
FIG. 2 shows a lamination stack of the crimp connector from FIG. 1.
Figure 3:
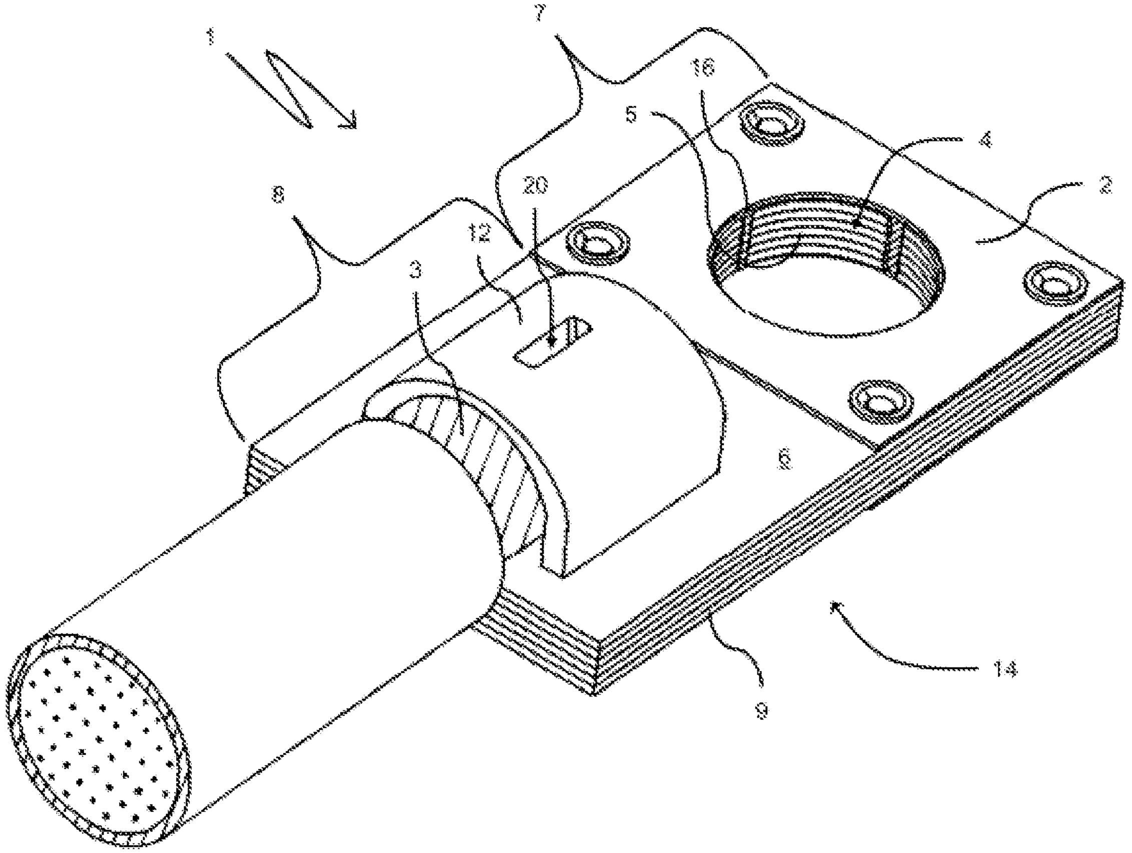
FIG. 3 shows a perspective illustration of a crimp connection according to the invention comprising the crimp connector from FIGS. 1 and 2.

The magnitude of increase in the widths of the cutouts 10 in the metal sheets 6 of the crimp connector 1 according to the invention, which increase as the distance with respect to the base metal sheet (or sheets) 9 increases, decreases with increasing distance with respect to the base metal sheet (or sheets) 9, which is to say the step width of the steps transversely to the depression 11 (a depth of the "tread") decreases with increasing distance with respect to the base metal sheet or sheets 9, as is apparent in FIG. 2. An imaginary curved line of the cross-section of the depression 11 at the sides of the depression 11 through edges of the steps does not therefore consist of straight lines that ascent obliquely with respect to the base of the depression 11, but extends in an arc shape. The cross-section of the step-shaped depression 11 is thus adapted to an electrical conductor 3 having a round, not necessarily circular cross-section.

Single-piece embodiments of the crimp connector 1 according to the invention without stacked metal sheets, but with a metal sheet having a trough-shaped depression 11 incorporated in the connection zone 8 thereof, for example by plastic deformation, such as stamping, or by machining, such as grinding or milling (not shown), are also possible. The depression 11 preferably has a step-shaped cross-section and depressions having different cross-sections, for example an angular, right-angled or trapezoidal cross-section, or having a circularly or non-circularly rounded cross-section, however, are likewise possible (not shown).

In the exemplary embodiment, the crimp connector 1 according to the invention comprises two base metal sheets 9 and six metal sheets 6 having cutouts 10 with differing widths, which are disposed on one side of the two base metal sheets 9 so as to be layered against or on top of one another, wherein metal sheets 6 having a narrower cutout 10 are disposed closer to the base metal sheet or sheets 9, and metal sheets 6 having a wider cutout 10 are disposed further away from the metal sheet or sheets 9.

The two cover sheets 17 are disposed in the contact region 7 coaxially with respect to the insertion hole 4, at the top and bottom of the stacked metal sheets 6. In the exemplary embodiment, the two cover sheets 17 and the metal sheets 6, 9 are held together by four rivets 18, which are disposed around the insertion hole 4. The metal sheets 6, 9, 17 can also be held together in another manner.

The crimp connector 1 according to the invention comprises a crimp clamp 12, which can be integral with the crimp connector 1, but in the exemplary embodiment is a component separate from the crimp connector 1 or from the metal sheets 6, 9 thereof. The crimp clamp 12 is disposed in the connection zone 8 of the connecting contact 2 or of the stacked metal sheets 6, 9 that form the connecting contact 2. In the exemplary embodiment, the crimp clamp 12 is made of a metal sheet strip that is initially bent into a U-shaped bracket (see FIG. 1). Legs of the U-shaped bracket forming the crimp clamp 12 are inserted through apertures 13 in the layered metal sheets 6, 9 of the crimp connector 1. In the exemplary embodiment, the apertures 13 are designed as slots on both sides of the cutouts 10 in the metal sheets 6, 9, which form the depression 11 in the connection zone 8 of the crimp connector 1. The crimp clamp 12 inserted through the apertures 13 of the metal sheets 6, 9 and the rivets 18 hold the layered metal sheets 6, 9 in the positions thereof in which these are layered or stacked congruently on top of or against one another.

Figure 4:
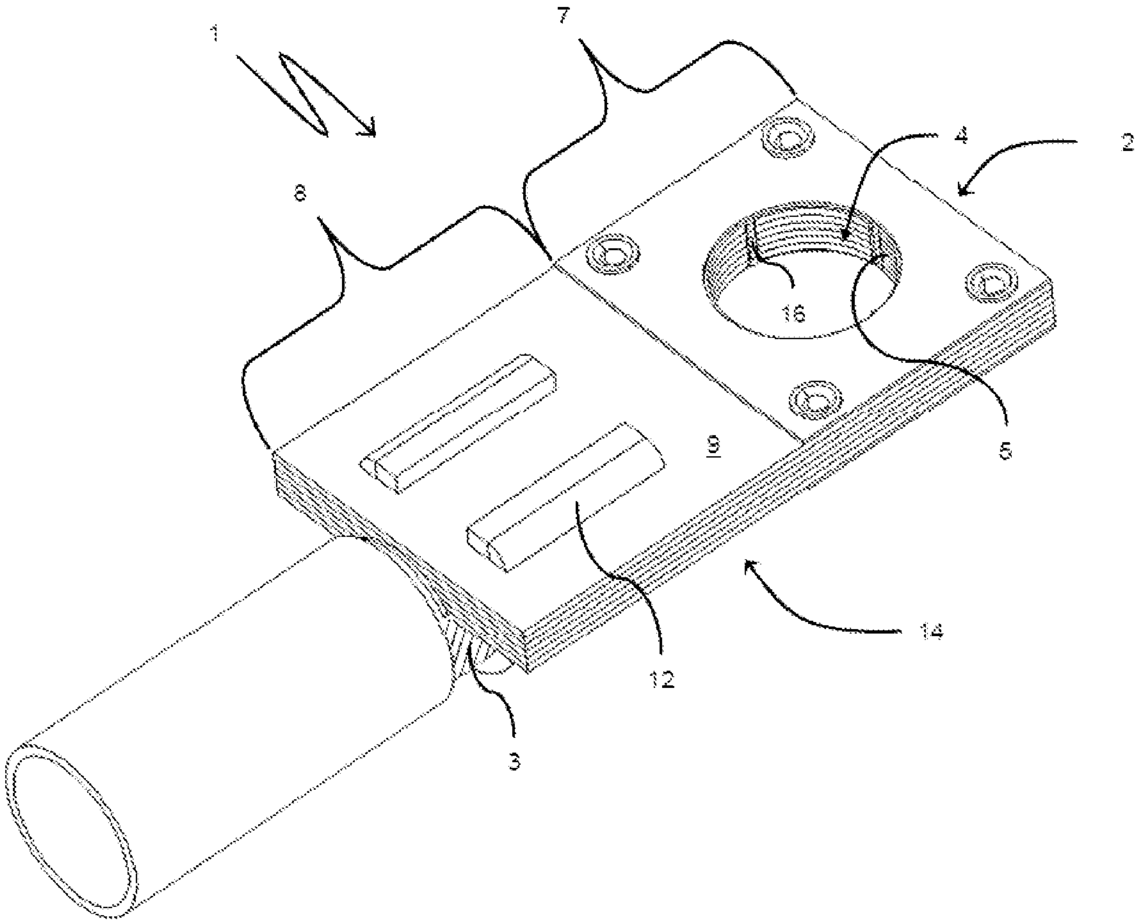
FIG. 4 shows the crimp connection from FIG. 3 in a perspective illustration, looking at an opposite side compared to FIG. 3.

The crimp clamp 12 is disposed at the connecting contact 2 of the crimp connector 1 according to the invention in such a way that a yoke of the U-shaped bracket forming the crimp clamp 12 encloses the electrical conductor 3 on a side located opposite the depression 11 in the connecting contact 2, and legs of the crimp clamp 12 extend past the electrical conductor 12 on both sides, and pass through the apertures 13 in the metal sheets 6, 9 and, on a side of the metal sheets 6, 9 located opposite the electrical conductor 3, are bent 90° so as to connect the crimp clamp 12 to the connecting contact 2. The ends of the crimp clamp 12 bent on the side of the base metal sheets 9 can be seen in FIG. 4. Since the yoke of the crimp clamp 12 encloses the electrical conductor 3, the crimp clamp 12 continuously, without interruption, encloses the electrical conductor 3 on the side of the connecting contact 2 in which the depression 11 is located, in which the electrical conductor 3 rests with a portion of the circumference thereof.

So as to establish a crimp connection 14 according to the invention, the electrical conductor 3 is disposed in the depression 11 in the connection zone 8 of the crimp connector 1 according to the invention and between the legs of the U-shaped crimp clamp 12, which are inserted through the slots forming the apertures 13 on both sides of the depression 11. The electrical conductor 3 is a cable, for example, in particular a stranded wire, the stripped end of which is disposed in the depression 11 between the legs of the crimp clamp 12. Thereafter, the crimp clamp 12 is pushed at the yoke thereof in the direction of the metal sheets 6, whereby the electrical conductor 3 is clamped by the crimp clamp 12 in the depression 11 in the connection zone 8 of the crimp connector 1 and clamped in place between the depression 11 and the crimp clamp 12.

Ends of the legs of the crimp clamp 12 are bent on the opposite side, which is to say on the side of the base metal sheets 9, so that the crimp clamp 12 is connected to the metal sheets 6, 9 and clamps the electrical conductor in place in the depression 11.

So as to improve a mechanical retention of the electrical conductor 3 in the longitudinal direction thereof in the crimp clamp 12, a bead is incorporated into the yoke of the crimp clamp 12 by embossing, which on the inside engages with the electrical conductor 12 in the yoke of the crimp clamp 12, forming a depression 19 there, which is shown in FIG. 1. Generally speaking, the bead of the crimp clamp 12 can also be interpreted as a protrusion 20 in the crimp clamp 12, which engages with the electrical conductor 3 and improves the mechanical retention thereof in the longitudinal direction in the crimp clamp 12.

The stranded wire forming the electrical conductor 3 in the exemplary embodiment has a conductor cross-section without insulation of, for example, 125 $mm^2$ and a conductor diameter without insulation of, for example, 25 to 28 mm. A pressing force, exerted perpendicularly to the connecting contact 2 onto the yoke of the crimp clamp 12, for clamping the electrical conductor 3 in place in the crimp clamp 12 and in the depression 11 in the connection zone 8 of the crimp connector 1 is 20 t (tons), for example. During pressing, the legs of the crimp clamp 12 are supported laterally from the outside, so as to be prevented from bending outwardly.

When the stranded wire forming the electrical conductor 3 is being crimped in place, the individual wires of the stranded wire are integrally formed onto the steps at the sides of the depression 11 in the connection zone 8, whereby both a mechanically secure connection between the electrical conductor 3 and the crimp connector 1 of the crimp connection 14 according to the invention and an readily electrically conducting connection having low electrical transition resistance between the electrical conductor 3 and the crimp connector 1 are achieved.

The crimp connector 1 according to the invention or the crimp connection 14 according to the invention is suitable for electrical current intensities of several 100 A (amperes), for example 800 A or more, and for the connection of or to electrical power sources having an electrical voltage of several 100 V (volt), for example 1,000 V or more. A possible or an intended use of the crimp connector 1 according to the invention or of the crimp connection 14 according to the invention is a connection of or to a driving battery/rechargeable battery of an electrically driven motor vehicle, in particular of an electrically driven truck.

The invention claimed is:

1. A crimp connector for a mechanical and electrically conductive connection to an electrical conductor, the crimp connector comprising a connection zone, for a connection to the electrical conductor, and a crimp clamp for enclosing and crimping the electrical conductor in place at the connection zone, wherein the connection zone of the crimp connector has a trough-shaped depression, in which the electrical conductor is disposed for connection, and wherein the connection zone of the crimp connector comprises layered metal sheets, at least one base metal sheet at a base of the depression bridging the depression, and metal sheets that are disposed in a layered manner on one side of the base metal sheet including cutouts, which laterally delimit the depression.

2. The crimp connector according to claim 1, wherein the trough-shaped depression has step-shaped cheeks.

3. The crimp connector according to claim 1, wherein the cutouts in the metal sheets layered on one side of the base metal sheet are wider as a distance with respect to the base metal sheet increases.

4. The crimp connector according to claim 1, wherein the crimp clamp is a separate component from the crimp connector, which encloses the connection zone and the electrical conductor.

5. The crimp connector according to claim 1, wherein the crimp clamp holds the metal sheets in layered positions thereof with respect to one another.

6. The crimp connector according to claim 5, wherein the layered metal sheets have apertures through which the crimp clamp passes.

7. The crimp connector according to claim 4, wherein the crimp clamp continuously encloses the electrical conductor on the side of the connection zone in which the trough-shaped depression is located, and is fixed on both sides of the electrical conductor to the connection zone.

8. The crimp connector according to claim 1, wherein the crimp clamp has a protrusion, which is integrally formed in the electrical conductor, on an inner side facing the electrical conductor.

9. A crimp connection, comprising an electrical conductor and an electrical connecting contact, which comprises a crimp connector according to claim 1, which connects the electrical conductor mechanically and electrically conductively to the electrical connecting contact, wherein the electrical conductor is disposed in the depression in the connection zone of the crimp connector, and is enclosed by the crimp clamp and crimped in place in the depression.

10. The crimp connection according to claim 9, wherein the crimp clamp is a separate component from the crimp connector, which encloses the connection zone and the electrical conductor, clamps the electrical conductor together with the connection zone of the crimp connector, and clamps the electrical conductor in the depression in the connection zone of the crimp connector.

11. The crimp connection according to claim 9, wherein the electrical conductor comprises a stranded wire.

* * * * *